United States Patent
Seiber et al.

(10) Patent No.: US 9,940,390 B1
(45) Date of Patent: Apr. 10, 2018

(54) CONTROL SYSTEM USING SCOPED SEARCH AND CONVERSATIONAL INTERFACE

(71) Applicant: Microsoft Technology Licensing, LLC, Redmond, WA (US)

(72) Inventors: Scott E. Seiber, Medina, WA (US); Lawrence B. Ripsher, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/278,003

(22) Filed: Sep. 27, 2016

(51) Int. Cl.
*G06F 17/30* (2006.01)
*G06F 3/16* (2006.01)

(52) U.S. Cl.
CPC ........ *G06F 17/30772* (2013.01); *G06F 3/165* (2013.01); *G06F 17/30749* (2013.01)

(58) Field of Classification Search
CPC ..................... G06F 17/30053; G06F 17/30772
USPC ...... 340/7.55; 370/352; 380/201; 455/412.2, 455/456.3; 704/275, 235; 705/51; 713/171; 715/767, 853; 725/9, 53, 81; 345/633; 700/94; 707/769; 709/204, 709/206
See application file for complete search history.

(56) References Cited

U.S. PATENT DOCUMENTS

| | | | | |
|---|---|---|---|---|
| 5,696,500 A | * | 12/1997 | Diem | H04N 5/4401 340/7.1 |
| 6,535,854 B2 | * | 3/2003 | Buchner | H04L 12/2803 340/4.4 |
| 8,306,976 B2 | | 11/2012 | Handman et al. | |
| 8,704,073 B2 | | 4/2014 | Georges | |

(Continued)

FOREIGN PATENT DOCUMENTS

| | | |
|---|---|---|
| WO | 2012135226 A1 | 10/2012 |
| WO | 2013067459 A1 | 5/2013 |

OTHER PUBLICATIONS

Cross, Jason, "A list of all the Google Now voice commands," available at <<http://greenbot.com/article/2359684/android/a-list-of-all-the-ok-google-voice-commands.html>>, Greenbot, IDG Consumer & SMB, published on Jun. 6, 2016, 6 pages.

(Continued)

*Primary Examiner* — Gerald Gauthier
(74) *Attorney, Agent, or Firm* — Rainier Patents, P.S.

(57) ABSTRACT

A technique is described herein for controlling equipment in a local environment. The technique can use a conversational interface component to receive messages from any user in a group of users. In a media-related context, a media BOT receives each message and determines whether it contains a command to play a particular media item. If so, the media BOT formulates the message as an input query and sends the input query to a search system, with instruction to perform a domain-specific search. The search system identifies a top-ranked media item based on the input query, selected (Continued)

from among a curated media-specific corpus. By virtue of the use of the scoped search system, the technique can successfully leverage preexisting linguistic processing mechanisms. The technique can also generate group profiles associated with users who interact with the conversational interface component, and then use the group profiles to automatically select media items.

20 Claims, 8 Drawing Sheets

(56) References Cited

U.S. PATENT DOCUMENTS

| | | | |
|---|---|---|---|
| 9,043,407 B1 | 5/2015 | Gaulke et al. | |
| 9,189,479 B2 | 11/2015 | Spivack et al. | |
| 2002/0101854 A1* | 8/2002 | Siegrist | H04M 3/5183 370/352 |
| 2005/0050151 A1 | 3/2005 | Mitchell et al. | |
| 2006/0020548 A1* | 1/2006 | Flather | H04N 21/4316 705/51 |
| 2007/0043878 A1 | 2/2007 | Carlson et al. | |
| 2007/0073651 A1 | 3/2007 | Imielinski | |
| 2007/0244903 A1 | 10/2007 | Ratliff et al. | |
| 2008/0019516 A1* | 1/2008 | Fransdonk | H04N 7/1675 380/201 |
| 2008/0040759 A1* | 2/2008 | She | H04L 29/06027 725/81 |
| 2009/0298474 A1* | 12/2009 | George | G10L 13/00 455/412.2 |
| 2010/0223223 A1 | 9/2010 | Sandler et al. | |
| 2011/0145581 A1* | 6/2011 | Malhotra | H04L 63/126 713/171 |
| 2012/0233273 A1 | 9/2012 | Miner et al. | |
| 2013/0111526 A1* | 5/2013 | Glowaty | G06F 17/30817 725/53 |
| 2013/0191122 A1 | 7/2013 | Mason | |
| 2014/0259032 A1* | 9/2014 | Zimmerman | H04N 21/4667 725/9 |
| 2015/0020011 A1* | 1/2015 | Roberts | G11B 27/28 715/767 |
| 2015/0081361 A1 | 3/2015 | Lee et al. | |
| 2015/0200880 A1 | 7/2015 | Kunstek et al. | |
| 2016/0044380 A1 | 2/2016 | Barrett | |
| 2017/0124092 A1* | 5/2017 | Eyal | G06F 17/30053 |

OTHER PUBLICATIONS

"Commands list," available at <<https://github.com/SexualRhinoceros/MusicBot/wiki/Commands-list>>, GitHub, Inc., accessed on Aug. 1, 2016, 5 pages.

"Sonos Zone Player 100, Product Guide," available at <<www.sonos.com/documents/productguides/en/zoneplayer100_en.pdf>>, SONOS, Inc., Santa Barbara, CA, accessed on Sep. 25, 2016, 17 pages.

"Spotify," available at <<https://en.wikipedia.org/wiki/Spotify>>, Wikipedia online encyclopedia entry, accessed on Sep. 27, 2016, 18 pages.

"Slack (software)," available at <<https://en.wikipedia.org/wiki/Slack_(software)>>, Wikipedia online encyclopedia entry, accessed on Sep. 27, 2016, 4 pages.

"International Search Report and Written Opinion Issued in PCT Application No. PCT/US2017/052361", dated Nov. 27, 2017, 13 Pages.

* cited by examiner

CONTROL SYSTEM USING SCOPED SEARCH AND CONVERSATIONAL INTERFACE

BACKGROUND

The industry offers numerous control mechanisms for use in interacting with various devices in a local setting, such as media playback equipment provided in a user's home or work environment. For instance, a user may build a local network having a control device and one or more media playback devices (e.g., speakers). In operation, an authorized user may interact with the control device to select one or more media items (e.g., songs) for playback on the media playback equipment, e.g., by calling up a list of available media items, and selecting one or more items from the list. While the above approach is relatively straightforward, some users may experience it as cumbersome and inefficient.

The technical literature generally describes more complex man-machine control interfaces compared to the mechanism described above. But these types of interfaces can also be expensive and time-consuming to develop, test and maintain. And once developed, these interfaces can potentially offer uneven performance due to their increased complexity.

SUMMARY

A computer-implemented technique is described herein for controlling media playback equipment (and other kinds of equipment) in a resource-efficient manner, while offering good user experience. In one media-related implementation, the technique uses a media BOT to intercept a message entered by a user via a message interface component. The media BOT then determines whether the message includes a selection control command that specifies a target media item (such as a desired song) to be played by the media playback equipment. If such a command is detected, the media BOT formulates an input query that includes the message. The media BOT sends the input query to a search system, with an instruction that the search system is to perform a domain-specific search.

In response to the input query, the search system generates a query response that identifies a top-ranked media item, if any, and sends the query response to the media BOT. The search system performs this operation by searching a curated media-specific corpus of media items. The media-specific corpus corresponds to a particular search domain within a much broader informational universe that is otherwise available to the search system.

Upon receiving the query response, the media BOT generates selection command information based on the query response. A local system uses the selection control information to control the media playback equipment.

According to another illustrative aspect, the message interface component corresponds to a conversational interface component. The conversational interface component provides one or more instances of a collaborative user interface presentation for use by respective users in a group of users, including the particular user. The users can interact with the conversational interface component to converse with each other (by formulating user-to-user messages), and to control the playback equipment (by formulating user-to-BOT messages).

According to another illustrative aspect, the search system operates by performing preprocessing on the input query, searching the curated media-specific corpus to identify a set of media items (if any) that match the preprocessed input query, and ranking the media items in the set to generate the top-ranked media item (if any).

According to another illustrative aspect, the media BOT posts the selection command information to a command buffering component. The local system pulls the selection command information from the command buffering component.

According to another illustrative aspect, the technique allows a group of users to control any piece of equipment in a local setting via the conversational interface component, with or without interaction with the search system.

By virtue of the use of the search system, the technique can successfully leverage preexisting linguistic processing mechanisms, thereby providing an enhanced control interface without the need to develop custom-built one-off linguistic processing mechanisms for exclusive use in controlling the media playback equipment. By virtue of the use of the conversational interface component, the technique provides an effective and enjoyable way by which users can coordinate amongst themselves to control media playback equipment in a shared local setting. By virtue of the use of the command buffering component, the local system can interact with an external network environment in a secure manner.

The above technique can be manifested in various types of systems, devices, components, methods, computer-readable storage media, data structures, graphical user interface presentations, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

Figure 1:
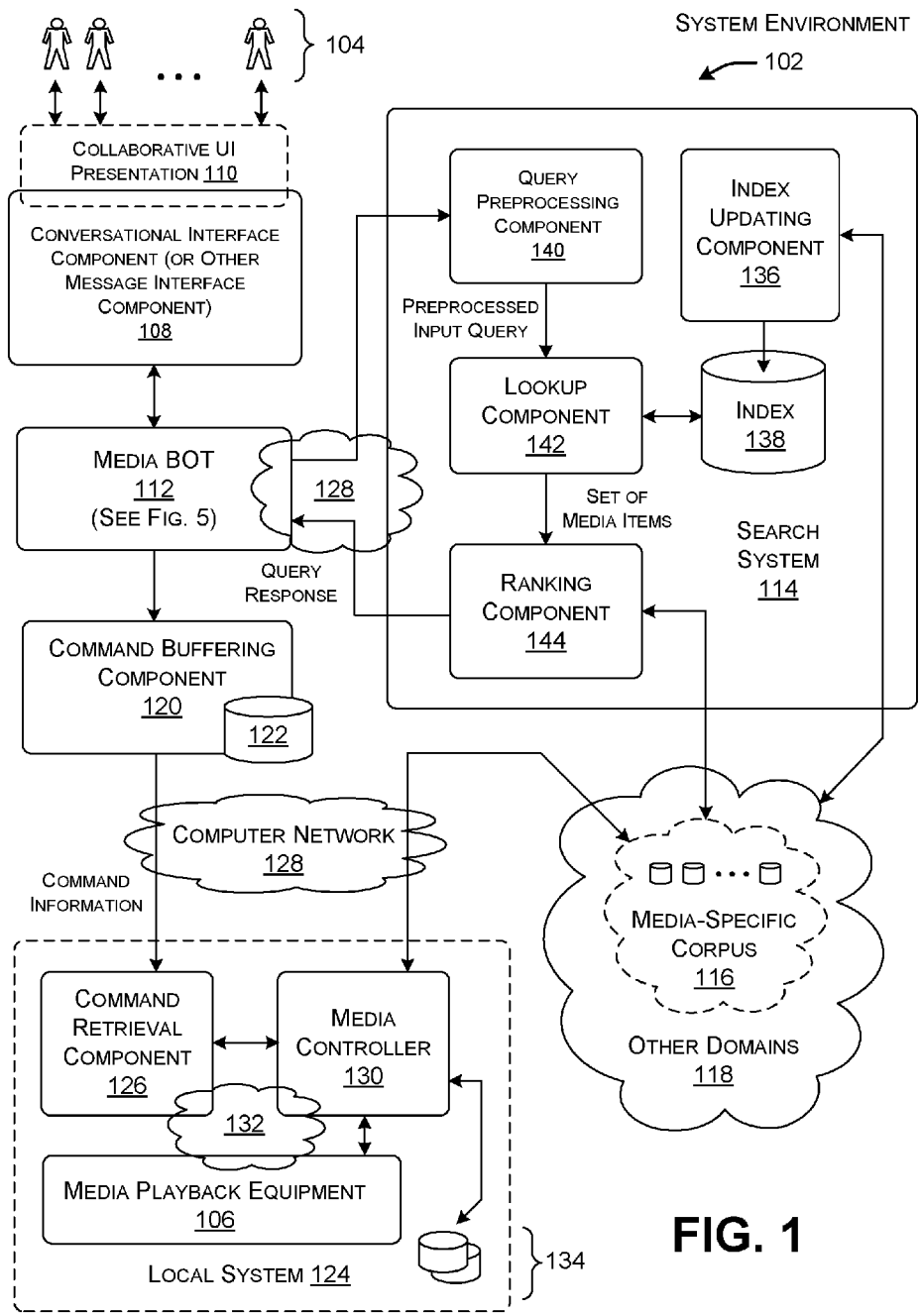
FIG. 1 shows an illustrative system by which one or more users can control media playback equipment using a search system.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes a computer-implemented system for controlling media playback equipment and other equipment. Section B sets forth illustrative methods which explain the operation of the system of Section A. And Section C describes illustrative computing functionality that can be used to implement any aspect of the features described in Sections A and B.

As a preliminary matter, some of the figures describe concepts in the context of one or more structural components, also referred to as functionality, modules, features, elements, etc. In one implementation, the various components shown in the figures can be implemented by software running on computer equipment, or other logic hardware (e.g., FPGA devices), etc., or any combination thereof. In one case, the illustrated separation of various components in the figures into distinct units may reflect the use of corresponding distinct physical and tangible components in an actual implementation. Alternatively, or in addition, any single component illustrated in the figures may be implemented by plural actual physical components. Alternatively, or in addition, the depiction of any two or more separate components in the figures may reflect different functions performed by a single actual physical component. Section C provides additional details regarding one illustrative physical implementation of the functions shown in the figures.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). In one implementation, the blocks shown in the flowcharts can be implemented by software running on computer equipment, or other logic hardware (e.g., FPGA devices), etc., or any combination thereof.

As to terminology, the phrase "configured to" encompasses various physical and tangible mechanisms for performing an identified operation. The mechanisms can be configured to perform an operation using, for instance, software running on computer equipment, or other logic hardware (e.g., FPGA devices), etc., or any combination thereof.

The term "logic" encompasses various physical and tangible mechanisms for performing a task. For instance, each operation illustrated in the flowcharts corresponds to a logic component for performing that operation. An operation can be performed using, for instance, software running on computer equipment, or other logic hardware (e.g., FPGA devices), etc., or any combination thereof. When implemented by computing equipment, a logic component represents an electrical component that is a physical part of the computing system, in whatever manner implemented.

Any of the storage resources described herein, or any combination of the storage resources, may be regarded as a computer-readable medium. In many cases, a computer-readable medium represents some form of physical and tangible entity. The term computer-readable medium also encompasses propagated signals, e.g., transmitted or received via a physical conduit and/or air or other wireless medium, etc. However, the specific terms "computer-readable storage medium" and "computer-readable storage medium device" expressly exclude propagated signals per se, while including all other forms of computer-readable media.

The following explanation may identify one or more features as "optional." This type of statement is not to be interpreted as an exhaustive indication of features that may be considered optional; that is, other features can be considered as optional, although not explicitly identified in the text. Further, any description of a single entity is not intended to preclude the use of plural such entities; similarly, a description of plural entities is not intended to preclude the use of a single entity. Further, a "set" or "subset," as used herein, refers to a collection of zero, one or more items. Further, while the description may explain certain features as alternative ways of carrying out identified functions or implementing identified mechanisms, the features can also be combined together in any combination. Finally, the terms "exemplary" or "illustrative" refer to one implementation among potentially many implementations.

A. Illustrative System

FIG. 1 shows a system 102 (also referred to as a system environment) by which one or more users 104 can control media playback equipment 106. As will be described at the end of this section, the system 102 can also be extended to controlling other equipment within a local setting, such as lighting equipment, home security equipment, etc. However, to facilitate and simplify the explanation, the system 102 will be primarily described below in the context in which the equipment to be controlled constitutes the media playback equipment 106.

The media playback equipment 106 presents media items in a local environment. For instance, the media playback equipment 106 can corresponding to music-playing equipment for playing songs and other audio items, video-playing equipment for playing movies, etc., or any combination thereof. The local environment can correspond to any shared setting in which the users 104 consume the media items. For example, the local environment can correspond to one or more rooms of a building and/or an outdoor venue in which the users 104 listen to music and/or video items provided by the media playback equipment 106.

The users 104 interact with the system 102 via a conversational interface component 108. In one implementation, the conversational interface component 108 provides a chat-like experience via one or more instances of a collaborative user interface (UI) presentation 110. That is, each user can interact with a separate instance of the collaborative UI presentation 110 via a user computing device. Each instance of the collaborative UI presentation 110 reveals an historical flow of messages entered by the users 104 over the course of a conversation. Further, at any given instance of time, a user may enter a new message via his or her instance of the collaborative UI presentation 110.

The messages entered by the users 104, via the conversational interface component 108, fall at least three classes of messages. A user enters a message of a first type with the primary intent of communicating with another user in the group. For instance, a first user may enter the message, "Does anyone want to hear some music?" with the intent of soliciting a response from other users. A user enters a message of a second type with the primary intent of instructing the media playback equipment 106 to play a particular media item, such as a particular song, movie, etc. For instance, a user may enter the message, "Play something new by Neil Young" with the intent of instructing the media playback equipment 106 to play a recently released song by the artist Neil Young. A user may enter a message of a third type with the intent of controlling the manner in which the media playback equipment 106 plays a media item that has already been selected or has yet to be selected. For instance, a user may enter the message, "Turn up the volume to 8" to instruct the media playback equipment 106 to increase the volume at which it plays a media item.

The above categories of messages are not mutually exclusive for various reasons. First, the conversational interface component 108 reveals a message entered by a user to all of the other users in the group, even if the primary intent of the message is to control the media playback equipment 106, rather than communicate with other users. Hence, any message directed to the media playback equipment 106 inherently also conveys information to other users. Second, a user may deliberately create a message that has at least two parts, including a first part intended to communicate information to other users, and a second part intended to control the media playback equipment 106. For instance, a user may enter the message, "Play some Neil Young from Harvest Moon, unless anyone objects." The first part of that message instructs the media playback equipment 106 to play music from a particular album release by the artist Neil Young. The second part of that message invites other users to object to the user's selection.

More generally, the system 102 can incorporate any message interface component for receiving messages from at least one user. In the embodiment of FIG. 1, the message interface component corresponds to a conversational interface component 108 that provides one or more instances of a collaborative UI presentation 110. But in other implementations, the message interface component provides an input mechanism for receiving messages from a user without revealing those messages to other users who are also entitled to interact with the message interface component. To nevertheless facilitate and simplify the explanation, the message interface component will be described below in the context of the implementation of FIG. 1, where it corresponds to the conversational interface component 108.

A media BOT 112 refers to a computer-automated agent. In operation, the media BOT 112 intercepts each message entered by a user. The media BOT 112 then determines whether the message pertains to the first type of message (which is primarily directed to conveying information to other users), or whether the message pertains to either the second or third types of message (which are primarily directed to controlling the media playback equipment 106). In the former case, the media BOT 112 takes no action with respect to the message. In the latter case, the media BOT 112 initiates processes within the system 102 that have the ultimate objective of controlling the media playback equipment 106. With respect to the latter case, the media BOT 112 can also provide feedback to the users 104 via the conversational interface component 108 which informs the users 104 of changes that have been made, or will be made, to the media playback equipment 106; alternatively, or in addition, the media BOT 112 can solicit additional information from the users 104 with the intent of clarifying the intent of the users 104.

In other words, the media BOT 112 analyzes each message to determine whether it is a user-to-user message or a user-to-BOT message. A user-to-user message has the sole intent of conveying information to another user, rather than conveying an instruction to the media playback equipment 106. A user-to-BOT message includes at least a part which has the primary intent of controlling the media playback equipment 106. With respect to a user-to-BOT message, the media BOT 112 perform the further task of determining whether it contains: a selection control command, in which a user specifies a target media item to be played by the media playback equipment 106; and/or a non-selection control command, corresponding to any media control command other than a selection control command.

Additional details regarding the operation of the media BOT 112 will be set forth below with respect to FIG. 5. As a preview of that explanation, the media BOT 112 can discriminate among the above-described types of messages by detecting triggering features in the messages, such as telltale keywords. For example, the media BOT 112 can determine that the user has entered a message containing a selection control command when that message contains the keyword "play."

Assume the media BOT 112 determines that a particular message entered by a user contains a selection control command. If so, the media BOT 112 passes the entirety of the message, or a portion thereof, as an input query to a search system 114. The search system 114 generates a query response that identifies zero, one or more media items that match the input query, and then sends the query response to the media BOT 112. Upon receipt of the query response, the media BOT 112 generates selection control information based on the query response. The selection control information conveys instructions to the media playback equipment 106 to play the media item(s) identified in the query response. The media BOT 112 can also optionally send a BOT-generated message to the conversational interface component 108, which informs the users 104 of the media item(s) that have been selected.

In one implementation, the search system 114 is "scoped" insofar as it matches the input query against a curated media-specific corpus 116 of media items, rather than a much larger informational universe 118 of result items pertaining to other domains. For instance, the curated media-specific corpus 116 may pertain to a collection of songs provided by particular network-accessible service. For example, the curated media-specific corpus 116 may correspond to any podcast service, such as the SPOTIFY service provided by Spotify Technology S.A., of Stockholm, Sweden. In contrast, the larger information universe 118 of result items may correspond to all items accessible via a wide area network, such as all items available via the Web.

The curated media-specific corpus 116 is "curated" in the sense that a provider of the corpus 116 applies one or more provider-specific rules to govern: (a) what kinds of items are stored in the corpus 116; and (b) what format(s) are used to store the items in the corpus 116. For instance, the provider can adopt a rule that specifies that only media items that meet certain digital rights management (DMR) criteria are permitted to be stored in the corpus 116. Further, the provider can adopt a rule that specifies that each media item that is stored is accompanied by well-defined descriptive metadata. That metadata can convey various attributes pertaining to the media item, such as: one or more identifiers associated with the media item; a title pertaining to the media item; an artist associated with the media item; a release date associated with the media item, a brief description of the media item, and so on. Finally, the provider can adopt a rule that specifies that the playable content of each media item is stored in a prescribed format (or formats).

In the case of an existing provider such as SPOTIFY, a well-established and highly uniform media-specific corpus already exists. In another implementation, a community of authorized individuals can create a custom media-specific corpus for specific use with the system 102. The community can adopt a standard which specifies the preferred format of media items stored by the corpus. The community can also establish an enforcement mechanism for rejecting newly submitted media items that do not conform to the preferred format.

In one case, the search system 114 is implemented using at least some of the processing resources provided by a commercially available general-purpose search engine, such as the BING search engine provided by Microsoft Corporation of Redmond, Wash. In some cases, the general-purpose search engine is originally designed and configured to perform a domain-agnostic search over all candidate result items provided in the larger information universe 118. In the context of the system 102, however, the search system 114 is constrained to match the input query against just the curated media-specific corpus 116.

In one implementation, the media BOT 112 can instruct the search system 114 to perform a scoped search (instead of a normal domain-agnostic search) by submitting an instruction to that effect, along with the input query. For example, the media BOT 112 can provide an instruction that specifies that the input query is to be searched with respect to a domain associated with a particular uniform resource locator (URL). For instance, the media BOT 112 can convey this instruction as a parameter in an application programming interface (API) exposed by the search system 114. The system 102 responds to the instruction by performing its search operations with respect to the identified corpus, rather than the larger informational universe 118.

In another scenario, assume that the media BOT 112 intercepts a message that contains a non-selection control command. As noted above, a non-selection control command pertains to any command that controls the operation of the media playback equipment 106, other than a command to select a particular media item. Without limitation, illustrative non-selection control commands correspond to requests to increase the volume, decrease the volume, pause playback, resume playback, stop the playback, move forward within the playback (e.g., by fast-forwarding within the playback), move backward within the playback (e.g., by rewinding within the playback), and so on. Upon detecting a non-selection control command, the media BOT 112 can immediately generate non-selection control information associated with that command, without interacting with the search system 114. The system 102 uses the non-selection control information to control the media playback equipment 106. The media BOT 112 can optionally also send a BOT-generated message to the conversational interface component 108 which identifies the nature of the control information that has been (or will be) sent to the media playback equipment 106.

To summarize, the media BOT 112 generates selection control information upon encountering a selection control command in a message. This operation involves sending the message containing the selection control command to the search system 114. The media BOT 112 generates non-selection control information upon encountering a non-selection control command in a message, without interacting with the search system 114. And the media BOT 112 generates no control information when the message contains neither a selection control command nor a non-selection control command.

A command buffering component 120 receives instances of control information from the media BOT 112 and stores those instances in a data store 122. More specifically, assume that the system 102 assigns a particular account ID to the particular group of users 104. The command buffering component 120 can store all instances of control information created by the users 104 in a particular storage space (e.g., a particular file) within data store 122, associated with that account ID. The command buffering component 120 can store instances of control information associated with another group of users (not shown) in another storage space within the data store 122, associated with another account ID.

The command buffering component 120 can ensure the privacy of information stored in the data store 122 using any security mechanisms, such as password-protection mechanisms, encryption mechanisms, etc. An entity can retrieve control information from the data store 122 only after specifying a valid account ID and submitting the appropriate credentials (e.g., a valid password and/or encryption key(s) associated with the specified account ID).

In one implementation, and as described more fully in FIG. 2 (below), at least some of the components of the system 102 are implemented by one or more remote computing systems, through which users interact using respective user computing devices. A local system 124, by contrast, corresponds to any equipment provided in the local environment in which media items are presented to the users 104 via the media playback equipment 106. For instance, the local system 124 may correspond to all equipment provided within one or more rooms of a building. The users 104 may correspond to a group of individuals who work together as a team in that building. Or the users 104 may correspond to family members who work together in that building, etc.

The local system 124 can include a command retrieval component 126 which pulls instances of control information from the command buffering component 120 over a computer network 128. For instance, in a first implementation, the command retrieval component 126 can periodically interrogate the command buffering component 120 (e.g., every 3 seconds). Upon each interrogation, the command retrieval component 126 identifies an account ID and the appropriate credentials associated with that account ID. In response, the command buffering component 120 validates the inquiry, and then determines whether the data store 122 includes any new instances of control information that have not yet been downloaded to the local system 124. Upon identifying new instance of command information, the command buffering component 120 forwards the new instances to the command retrieval component 126.

In a second implementation, the command buffering component 120 can proactively notify the command retrieval component 126 when any new instances of control information have been received by the media BOT 112. The command retrieval component 126 can then access the new instances of control information in the manner specified above.

The first and second implementations both involve receiving new instances in response to a polling request by the local system 124, which helps help reduce the risk that malicious agents in the external network environment can gain unauthorized access to the resources of the local system 124. But in a third implementation, the command buffering component 120 can automatically forward the new instances of control information to the command retrieval component 126, without first notifying the command retrieval component 126 of the arrival of those new instances.

A media controller 130 interacts with the media playback equipment 106 to execute each instance of control information. In some implementations, the media controller 130 represents a component that is separate from the media playback equipment 106. In other implementations, the media controller 130 represents a component that is integrated into the media playback equipment 106. A local network 132 couples all components of the local system 124 together. For instance, the local network 132 may include a router which couples the media controller 130 to each playback device associated with the media playback equipment 106. In one implementation, the local network 132 uses the Universal Plug and Play (UPnP) protocol to coordinate interaction among its components, and to handle the addition and removal of components from the local network 132.

In a first scenario, assume that a new instance of selection control information has been received. The selection control information specifies an item ID of at least one media item. The media controller 130 establishes a connection with the source(s) of the identified media item(s), and then directs the media playback equipment 106 to play the media item(s). For instance, in one implementation, the media controller 130 can establish a connection with a remote computing system associated with the curated media-specific corpus 116. The media controller 130 can then request the remote computing system to stream the requested media item(s), associated with the specified item ID(s), to the local system 124, for consumption by the media playback equipment 106. In another implementation, the media controller 130 can establish a connection with a local source 134 of the media item(s), such as a local storage device which stores the media item(s). The media controller 130 can then request the media playback equipment 106 to play the media item(s) obtained from the specified local source 134.

The media playback equipment 106 itself can include any combination of music playback equipment (e.g., corresponding to one or more speakers), video playback equipment (e.g., corresponding to one or more video presentation devices), etc. To cite merely one example, at least one playback device can include a speaker device provided by SONOS, INC., of Santa Barbara, Calif.

Now referring to the search system 114 in greater detail, the search system 114 can include a variety of processing components that it uses to process any input query, regardless of the origin of the input query. The system 102 leverages these preexisting processing components to perform the specific task of interpreting a message submitted by a user that contains a selection control command.

To begin with, the search system 114 includes an index updating component 136 for crawling the resources of the larger informational universe 118, e.g., corresponding to the resources provided by the entire Web. In doing so, the index updating component 136 inherently crawls the resources provided in the curated media-specific corpus 116. The index updating component 136 can use any strategy to crawl the Web. For instance, the index updating component 136 can use a collection of spiders to methodically investigate the linked resources of the Web. The index updating component 136 can then extract the contents from any new (or updated) resource that it encounters. In one implementation, the search system 114 can perform its crawling operation on a periodic basis.

The index updating component 136 then updates index information provided in an index data store 138. The index information maps the terms discovered in the web resources with the uniform resource locators (URLs) associated with those web resources. The index information provides a way of later identifying the web resources that contain a term identified in an input query. In one case, the index updating component 136 creates a conventional inverted index.

In a real-time phase of operation, an interface component (not shown) receives a new input query from either an actual user or the media BOT 112. In the case of the media BOT 112, the input query contains a message entered by a user which contains a selection control command, such as the message "I want to play a popular song by Neil Diamond." The interface component also receives an instruction that the input query is to be searched against the media-specific corpus 116, rather than the larger information universe 118.

A query preprocessing component 140 performs preprocessing on the input query to generate a preprocessed input query. The preprocessing can include any combination of operations, including, but not limited to: tokenization, parsing analysis, spelling correction, stemming, synonym expansion, stop word removal, named entity recognition, semantic analysis, term weighting, etc. As a general objective, the query preprocessing component 140 adds (and/or removes) information to (or from) the input query, which allows downstream components in the search system 114 to more efficiently process it.

Tokenization entails breaking the input query into its constituent parts (e.g., its constituent words). In one case, the query preprocessing component 140 performs tokenization by breaking the input query into parts demarcated by whitespace characters, and by the start and end of the input query string.

Parsing analysis entails assigning a descriptive label to each part of the query. The query preprocessing component 140 can use a hidden Markov model, a conditional random fields model, or any other statistical technique to perform the parsing.

Spelling correction entails correcting the spelling of a term in the input query. The query preprocessing component 140 can perform spelling correction by determining whether or not an input term is present within a dictionary. If the term is not present, the query preprocessing component 140 can identify the word in the dictionary which is closest to the input term, as assessed based on any metric of word similarity (e.g., edit distance). The query preprocessing component 140 can also consider word frequency information in choosing the correct spelling of a term, e.g., by more favorably weighting popular word candidates compared to unpopular word candidates.

Stemming analysis entails finding a root form of each word specified in the input query. The query preprocessing component 140 can perform stemming analysis using any strategy, such as by using a lookup table to map an input term to its canonical stemmed counterpart. Or the query preprocessing component 140 can apply a collection of suffix-stripping rules to generate the stemmed counterpart, etc.

Synonym expansion entails identifying the synonyms (if any) of a term in the input query and adding those synonyms to the input query. The query preprocessing component 140 can perform synonym expansion using a synonym dictionary which maps an input term to its semantically equivalent terms.

Stop word removal entails removing terms in the input query that constitute informational noise. The query preprocessing component 140 can perform stop word removal by removing any term in the input query that is present in an established stop word list.

Named entity recognition entails identifying parts of the input query, if any, which identify named entities. A named entity, in turn, refers to a particular person, organization, place, event, etc., often associated with a proper noun. The query preprocessing component 140 can identify named entities in the input query using a lookup dictionary that contains established named entities, and/or by using a machine-trained statistical model, etc.

Semantic analysis entails more generally interpreting the meaning of terms in the input query and/or the input query as a whole. The query preprocessing component 140 can perform semantic analysis in any manner, e.g., by using machine-trained deep-learning neural network. The deep-learning neural network can map an encoded version of the input query (or part thereof) into a vector in an abstract semantic space. The vector conveys information regarding the meaning of the input query.

Weighting analysis entails assigning weights to the individual terms in the input query. The query preprocessing component 140 can assign weights to a query term based on various factors, e.g., based on the frequency at which the term occurs in a corpus of documents, based on the frequency at which the term appears in previously encountered search terms, based on the position of the term in the input query, and so on.

The above-summarized query processing operations are cited by way of example, not limitation. Other implementations can apply one or more additional query processing operations not mentioned above, and/or can omit one or more query processing operations mentioned above.

A lookup component 142 finds a set of media items that match the preprocessed input query, culled from the curated media-specific corpus 116. For instance, in one manifestation, the lookup component 142 finds each media item that contains all the terms in the preprocessed input query, e.g., within the metadata associated with a song. The lookup component 142 uses the index information in the data store 138 to find matching media items. But the lookup component 142 relies on only that part of the index information in the data store 138 that is relevant to the curated media-specific corpus 116.

To facilitate and simplify explanation, the examples presented here correspond to the case in which the matching media items correspond to individual songs, movies, etc. But a matching media item may also refer to a collection of media items, such as a song playlist. For example, the search system 114 may identify a playlist as a candidate matching item when the user enters the command, "Play Neil Young's greatest hits."

A ranking component 144 ranks the media items identified in the set of media items in order of likelihood of matching the input query. The ranking component 144 can use any algorithm to perform this approach. In one case, the ranking component 144 uses a machine-trained statistical model to generate a confidence score for each candidate media item. It then picks the candidate media item(s) having the highest confidence score(s). The machine-trained statistical model operates by receiving a set of descriptive feature values for each candidate media item. The feature values describe the preprocessed input query and the candidate media item, and, optionally, other contextual information. The machine-trained statistical model then applies its machine-trained weight values to map the feature values into a score.

In one specific implementation, the machine-trained model can use a deep-learning neural network model. That model maps the preprocessed input query into a first vector in abstract semantic space, and then maps the candidate media item into a second vector in the abstract semantic space (wherein the second mapping operation can alternatively be performed beforehand, in offline fashion). The model then determines the degree of similarity between the input query and the candidate media item by determining the distance between the two vectors in the semantic space. The model can use any technique to assess the distance, such as a cosine similarity metric.

Overall, the system 102 offers various potential benefits. By virtue of the use of the search system 114, scoped in the manner described above, the system 102 can successfully leverage preexisting linguistic processing mechanisms, thereby providing an enhanced control interface while avoiding the need to develop custom-built one-off linguistic processing mechanisms. By virtue of the use of the conversational interface component 108, the system 102 provides an effective and enjoyable way by which users can coordinate amongst themselves to control the media playback equipment 106 in a shared local setting.

Figure 2:
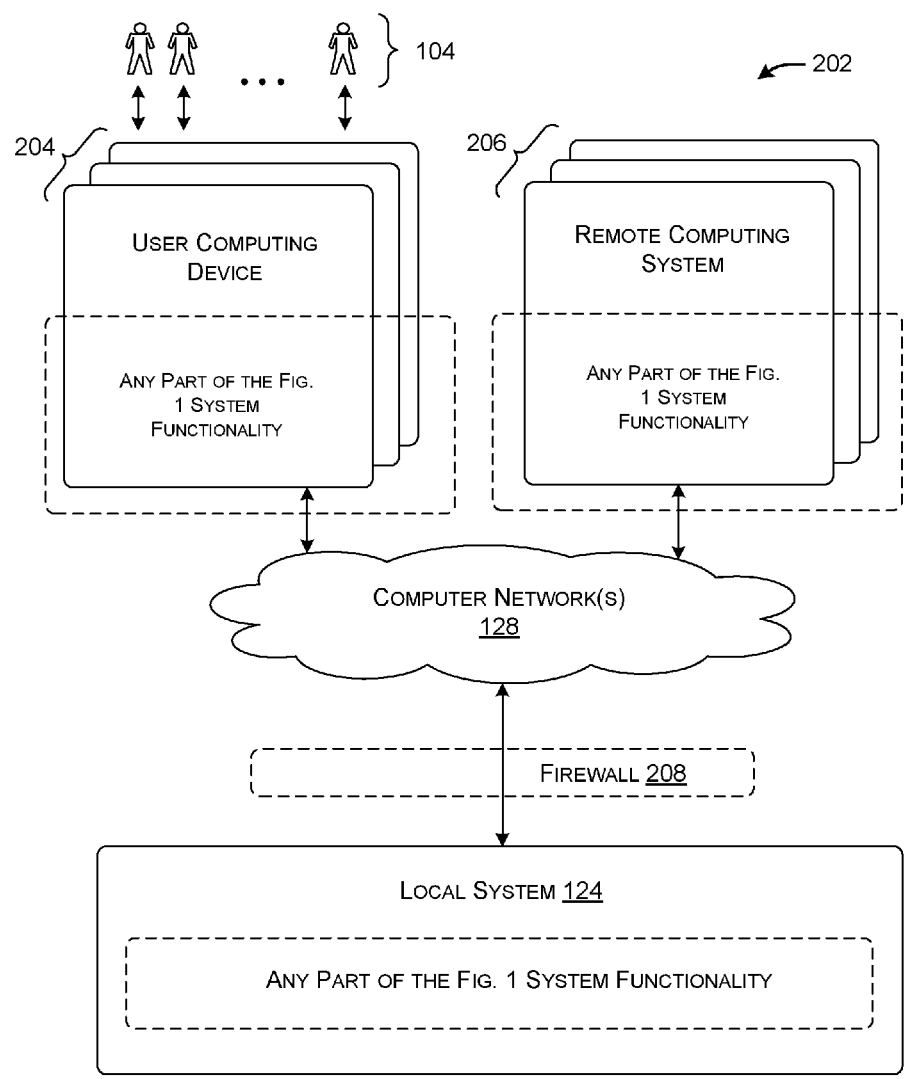
FIG. 2 shows computing equipment that can be used to implement the system of FIG. 1.

FIG. 2 shows computing equipment 202 that can be used to implement the system 102 of FIG. 1. The computing equipment 202 includes plural user computing devices 204, one or more remote computing systems 206, and the local system 124. The local system 124, in turn, includes the various components described above in connection with the explanation of FIG. 1. A computer network 128 enables interaction among the user computing devices 204, the remote computing system(s) 206 and the local system 124. Further, the local system 124 can interact with the other parts of the computing equipment 202 via a firewall 208. For instance, with reference to FIG. 1, the command retrieval component 126 can interact with the command buffering component 120 via the firewall 208.

Any user computing device shown in FIG. 2 can correspond to any type of computing equipment, such as a desktop or laptop personal computing device, a handheld computing device of any type (e.g., smartphone, tablet-type device, etc.), a set-top box, a game console, a wearable computing device, an intelligent appliance, etc. Any remote computing system shown in FIG. 2 can be implemented by one or more server computing devices and other computing equipment (e.g., routers, etc.). The computer network 128 can correspond to a wide area network (such as the Internet), a local area network, one or more point-to-point links, or any combination thereof.

Different implementations can delegate the components shown in FIG. 1 to the computing equipment 202 of FIG. 2 in different respective ways. FIG. 2 makes this general point by showing that any user computing device, any remote computing system, and the local system 124 can implement any part of the system functionality shown in FIG. 1. For instance, in some implementations, the conversational interface component 108 can correspond to a collaborative messaging application. That application can run on each user computing device and/or on a remote computing system. Likewise, the media BOT 112 can correspond to a computer program that runs on each user computing device and/or on a remote computing system. The collaborative message application can include a backend service which passes messages entered by the user to the media BOT 112.

The command buffering component 120 can correspond to a storage service provided by another remote computing system. The media BOT 112 can forward instances of control information to the command buffering component 120 via the computer network 128. The local system 124 can download instances of control information from the command buffering component 120 via the computer network 128, through the firewall 208.

The search system 114 can correspond to yet another remote computing system. The media BOT 112 can interact with the search system 114 via the computer network 128. As described above, in one implementation, the search system 114 uses the resources of a general-purpose search engine, which is configured, upon instruction from the media BOT 112, to perform its search over the curated media-specific corpus 116.

In other implementations, two or more components shown in FIG. 1 can be implemented by a single device or remote computing system. For example, the same remote computing system can host the media BOT 112 and the command buffering component 120.

From a management perspective, different entities can administer different respective components of the system 102 of FIG. 1. For example, a first service provider can host the conversational interface component 108, while a second service provider can host the media BOT 112. In other cases, a single entity can administer two or more components of the system 102 of FIG. 1. For example, the same entity can provide both the conversational interface component 108 and the media BOT 112.

Figure 3:
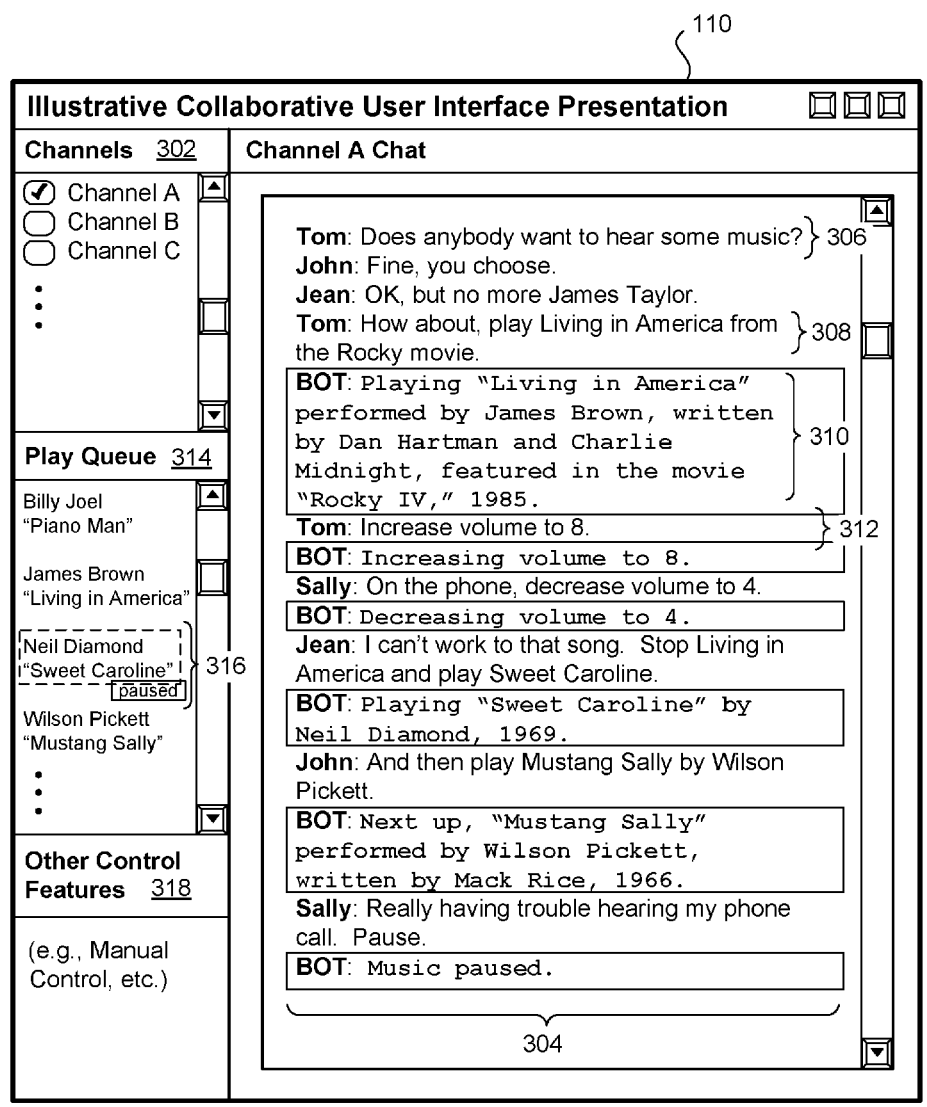
FIG. 3 shows an illustrative collaborative user interface presentation provided by the system of FIG. 1.

FIG. 3 shows an instance of the collaborative user interface (UI) presentation 110 provided by the conversational interface component 108 of FIG. 1. Note that the particular collaborative UI presentation 110 shown in FIG. 3 is presented in the spirit of illustration, not limitation. For instance, other implementations can add other functional features to the set of UI features shown in FIG. 3. Alternatively, or in addition, other implementations can omit one or more functional UI features shown in FIG. 3. Alternatively, or in addition, other implementations can vary the appearance and organization of the UI features shown in FIG. 3. Alternatively, or in addition, other implementations can use different graphical control mechanisms for receiving input from the user, compared to the graphical control mechanisms shown in FIG. 3. Finally, other implementations can interact with users using other modes compared to a visual graphical user interface presentation; for example, other implementations can receive input from users using voice recognition technology, and provide output to the users in spoken form.

Assume that a particular user, Tom, interacts with the collaborative UI presentation 110 via a first user computing device. Other users (e.g., users John, Jean and Sally) can interact with other instances of the collaborative UI presentation 110 via other user computing devices. Alternatively, or in addition, two or more users can interact with the same instance of the collaborative UI presentation 110 via the same user computing device.

A first section 302 invites the user, Tom, to select a particular channel, among a set of offered channels. Each channel corresponds to a particular focus of discussion. The focus can be defined with respect to any attribute(s), such as the subject matter of a conversation and/or the individuals that are included as participants of the conversation. Further, different channels may provide backend integration with different respective media BOTs.

For instance, a first channel (Channel A) may allow a first group of users to control music playback equipment in a shared environment. The first channel can provide backend integration with a first type of media BOT. A second channel (Channel B) may allow a second group of users to control video playback equipment in another shared environment. The second channel can provide backend integration with a second type of media BOT. Assume that the user (Tom) has selected the first channel (Channel A) because that user wishes to control music playback equipment within a work setting he shares with John, Jean and Sally.

In one case, each channel is associated with a restricted group of defined participants. Other users cannot take part in the conversation associated with that channel, unless first invited by one of the current participants of the conversation. In another case, each channel is associated with an open-ended group of participants. In that case, any user who is present within the shared environment can contribute to a conversation hosted by the channel. In the example of FIG. 3, assume that the user (Tom) chooses channel A. Further assume that the channel A involves at least four participants, Tom, John, Jean and Sally.

A second section 304 displays an ongoing conversation among the four users. For instance, in message 306, Tom first asks his colleagues whether they wish to hear music at the present time. This message 306 corresponds to a user-to-user message because it does not contain any command directed to the media playback equipment 106. After receiving input from others, Tom enters another message 308 that reads, "How about, play Living in America from the Rocky movie." This message 308 corresponds to a user-to-BOT message because the user is instructing the media playback equipment 106 to play a particular song. The media BOT 112 determines that the user has entered a selection control command via the message 308 because the user has typed the triggering keyword "play."

In response, the media BOT 112 submits the message 308 as an input query to the search system 114, along with an instruction to perform a scoped media-specific search. The media BOT 112 receives, in response to the input query, a query response which identifies a top-ranked song. The media BOT 112 then formulates selection control information which describes the top-ranked song for consumption by the local system 124. Further, in message 310, the media BOT 112 displays descriptive information regarding the top-ranked song. The message 310 allows the users to verify that the media BOT 112 has correctly interpreted Tom's message.

Next, assume that the user Tom formulates another message 312 which reads, "Increase volume to 8." The media BOT 112 will interpret this message 312 as a non-selection control command, e.g., due to the presence of "volume" and/or "increase" in the message. In response, the media BOT 112 directly formulates non-selection control information without interacting with the search system 114.

In the subsequent messages, other users react to Tom's media selection, e.g., by selecting additional media items, controlling the volume of the music playback, controlling the state of the music playback, and so on. In making these choices, the users are also communicating with each other.

Overall, the conversational interface component 108 provides an effective and enjoyable way of controlling shared equipment. In particular, the first section 302 informs each user of the control-related actions made by others, shedding light on who made the actions, and why the actions were made. This allows the user to react to the control-related actions in an appropriate manner, and to more effectively reach consensus as to future control-related actions.

For example, assume that a first user selects a song that a second user dislikes. Without the conversational interface component 108, the second user would need to manually canvas his or her colleagues to understand who made the song selection, and to gauge that user's "investment" in their song selection. The second user would then need to manually consult his or colleagues to pick a new song. The second user would then need to separately interact with a control device to choose a new song. Such a manual operation is potentially cumbersome, time-consuming and imprecise. It is also potentially the source of mutual irritation within the group.

Although not shown, there may be occasions in which the search system 114 cannot identify any media items with a desired degree of confidence. For instance, the ranking component 144 can assign a confidence score to each candidate item. The search system 114 can be said to generate uncertain results when the top-ranked media item has a confidence score below a prescribed threshold value. In this case, the media BOT 112 can generate a message which invites the user to rephrase his selection. Or the media BOT 112 can present the top-ranked media item to the user, and ask the user to confirm whether that media item is the item being sought by the user.

An optional third section 314 shows a queue of media items that have been, and will be, presented on the media playback equipment 106. The third section indicates that a particular song 316 is currently selected for playback, but that the playback is paused at the current time.

An optional fourth section 318 may provide control mechanisms (not specifically shown in FIG. 3) that allow each user to manually control the media playback equipment 106. For instance, the fourth section 318 can provide control mechanisms that allow the user to select a particular song, change the volume at which the song is played, pause the song, stop the song, etc.

Figure 4:
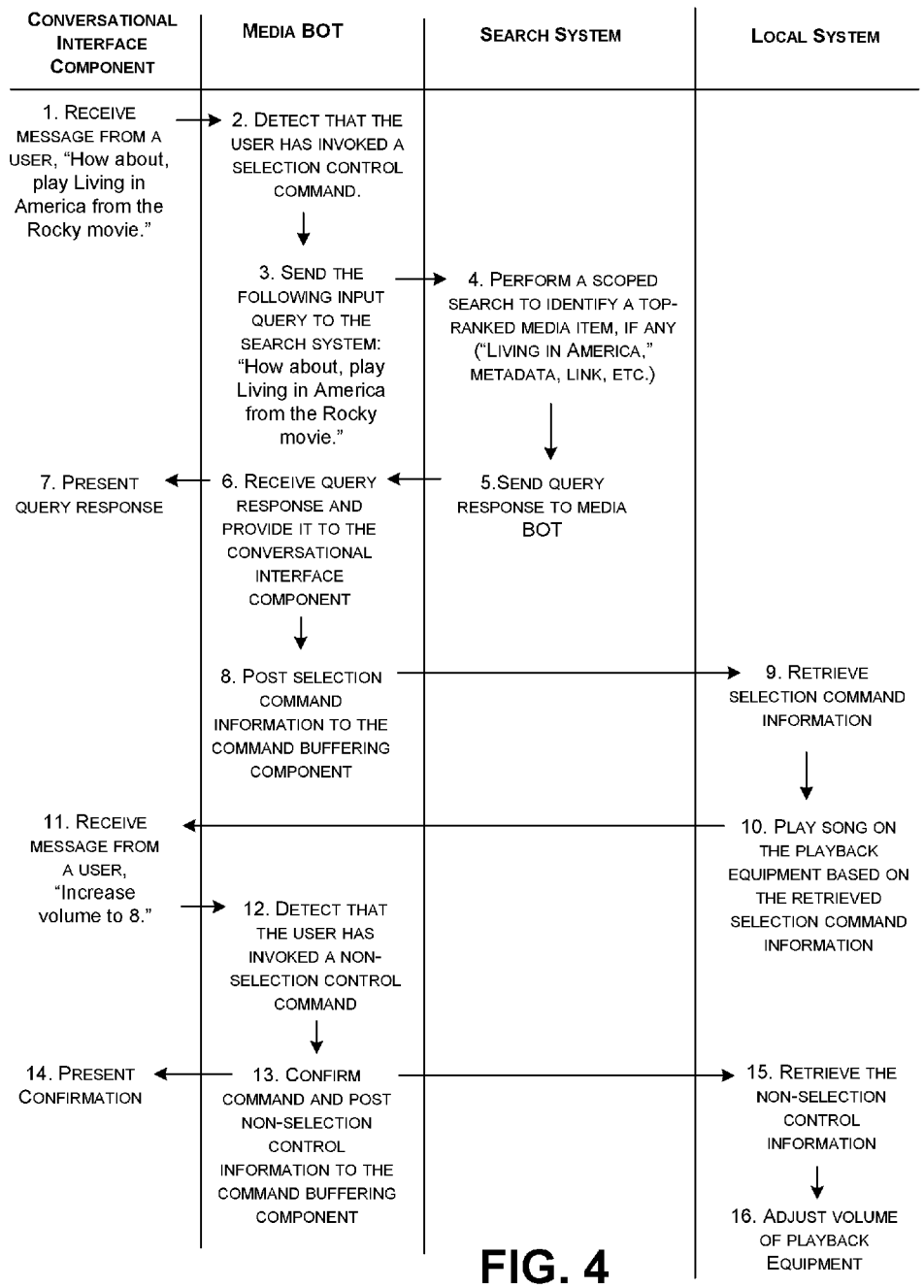
FIG. 4 shows an illustrative flow of operations performed by various components of the system of FIG. 1.

FIG. 4 shows an illustrative flow of operations performed by various components of the system 102 of FIG. 1. The flow of operations is triggered by the user's input of the message 308 and the message 312 shown in FIG. 3.

In operation (1), the conversational interface component 108 receives the message, "How about play Living in America from the Rocky movie." In operation (2), the media BOT 112 detects that the user has invoked a selection control command, e.g., by virtue of the fact that the message contains the word "play." In operation (3), the media BOT 112 sends an input query which includes the message entered by the user.

In operation (4), the search system 114 performs a search based on the input query to generate a query response. The query response identifies the song that most likely matches the media item being sought by the user. In operation (5), the search system 114 sends the query response to the media BOT 112.

In operation (6), the media BOT 112 receives the query response and optionally presents a BOT message to the conversational interface component 108. The BOT message informs the user of the song that has been identified by the search system 114. In operation (7), the conversational interface component 108 displays the BOT message to the user (as well as all of the other users). In operation (8), the media BOT 112 formulates selection command information based on the query response and posts that instance of selection command information to the command buffering component 120.

In operation (9), the local system 124 retrieves the selection control information from the command buffering component 120. In operation (10), the local system 124 plays the media item identified by the selection control information on the media playback equipment 106.

In operation (11), the conversational interface component 108 receives another message from the user, this time reading, "Increase volume to 8." In operation (12), the media BOT 112 intercepts the message, and detects that the user has entered a non-selection control command, e.g., by virtue of the fact that the message contains the words "volume" and/or "increase." In operation (13), the media BOT 112 formulates a BOT message which informs the user of its interpretation of the message, and its intent to control the media playback equipment 106 in a corresponding manner. Further, the media BOT 112 generates non-selection control information and posts that information to the command buffering component 120. In operation (14), the conversational interface component 108 presents the media BOT's message. In operation (15), the local system 124 retrieves the non-selection control information from the command buffering component 120. In operation (16), the local system 124 adjusts the volume of the media playback equipment 106, as instructed by the non-selection command information.

Although not shown, consider the scenario in which a single message includes both a selection control command and a non-selection control command, e.g., as when the user inputs the message, "Play Neil Young's Heart of Gold at volume level 5." The media BOT 112 will detect that the message contains both a selection control command and a non-selection control command. In response, the media BOT 112 will perform both types of control operations described in FIG. 4, e.g., by submitting the message as an input query to the search system 114, and formulating non-selection control information on the basis of the message. The search system 114 will likely inherently discount the trailing phrase "at volume level 5," unless there is a song by Neil Young that includes a similar phrase in its title. Similarly, the media BOT 114 can be configured to ignore content of the message (such as "Play Neil Young's Heart of Gold") that is not directly relevant to the instruction to control the volume of the media playback equipment 106.

Figure 5:
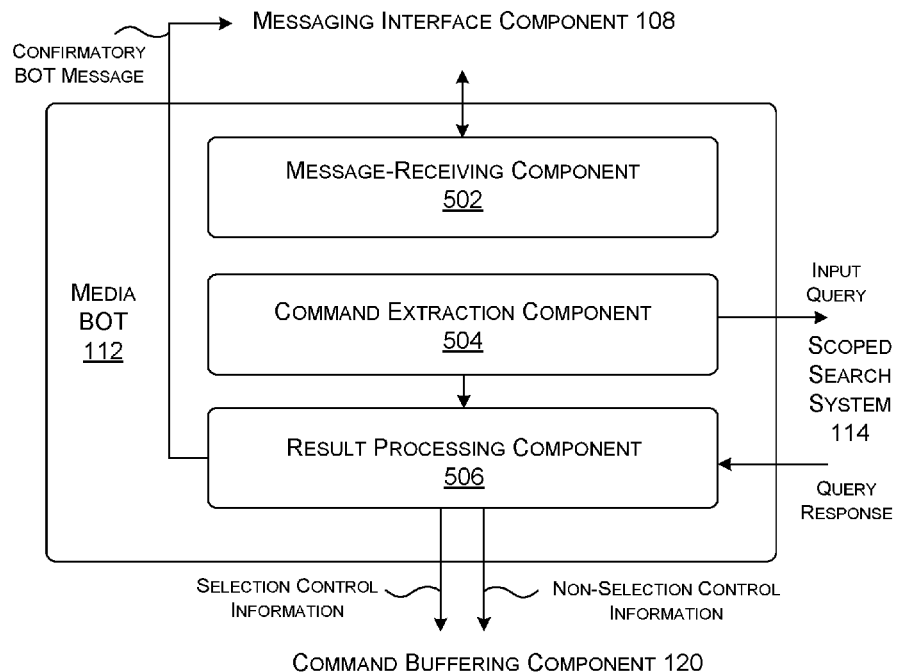
FIG. 5 shows one implementation of a media BOT, which is a component of the system of FIG. 1.

FIG. 5 shows one implementation of the media BOT 112. A message receiving component 502 intercepts a message provided by a user to the conversational interface component 108. The message receiving component 502 relies on a backend channel between the conversation interface component 108 and the media BOT 112.

A command extraction component 504 determines whether the message includes a selection control command or a non-selection control command, or a combination thereof. The command extraction component 504 can make this conclusion by determining whether the message contains one or more prescribed keywords associated with a selection control command (such as "play," "show," etc.), or one or more prescribed keywords associated with a non-selection control command (such as "increase," "decrease," "volume," "pause," "stop," "forward," "rewind," etc.). For a user-to-user message, the command extraction component 504 will determine that it contains no control command. In that case, the media BOT 112 will perform no further processing on the message Alternatively, or in addition, the command extraction component 504 can apply linguistic analysis to determine the intent of the message, e.g., by using a machined-learned statistical model to interpret the intent of the message.

Alternatively, or in addition, the command extraction component 504 can determine whether the user has explicitly invoked the services of the media BOT 112 by determining whether the user's message includes explicit reference to the BOT. For instance, the user may create a message, "BOT play Neil Diamond," or "BOT increase volume to 8," etc.

A result processing component 506 generates control information, corresponding to either selection control information and/or non-selection control information. The result processing component 506 then posts the control information to the command buffering component 120. The result processing component 506 can also generate a confirmatory BOT message which informs the users of what control action will be (or has been) taken.

The result processing component 506 can generate selection control information by extracting the item ID of the top-ranked media item from the query response. The result processing component 506 can also provide an instruction to the play the media item associated with the identified item ID.

Figure 6:
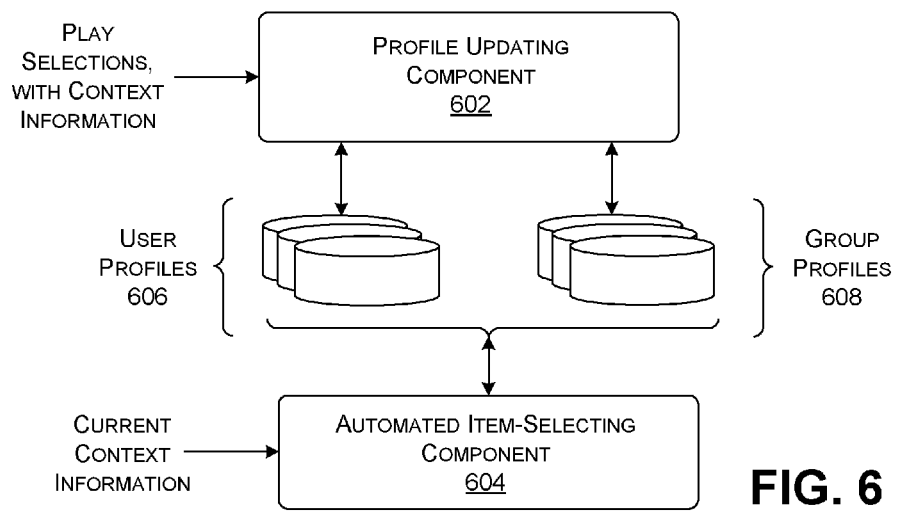
FIG. 6 shows one implementation of a profile updating component and an automated item-selecting component, for use in the system of FIG. 1.

FIG. 6 shows one implementation of a profile updating component 602 and an automated item-selecting component 604, for use in the system 102 of FIG. 1. The profile updating component 602 generates a user profile for each user who interacts with the system 102, and each group which interacts with the system 102. Overall, the profile updating component 602 generates a plurality of user profiles 606 and a plurality of group profiles 608.

Each user profile can identify the prior media selections made by a particular individual user, and/or other control selections made by that user. Each group profile can identify the prior media selections made by a particular group of users, and/or other control selections made by that group of users. The profile updating component 602 can also store metadata for each such selection. The metadata describes the contextual circumstance in which each selection was made. For example, a profile can identify that a user selected a media item on a particular day, at an identified time, etc.

The automated item-selecting component 604 automatically selects a media item based on the user profiles 606 and/or the group profiles 608. For instance, assume that a particular group of users is currently interacting with the system 102 in a current context. The automated item-selecting component 604 can first generate metadata that describes the current contextual situation, such as the current day of the week and the current time of the day (and/or any other environmental attribute(s)). The automated item-selecting component 604 can then consult a group profile of the group to identify the selections made by that group of users in the past in the same contextual situation. The automated item-selecting component 604 can then identify at least one media item that is similar to the previous selections.

The automated item-selecting component 604 can make the above similarity determination in different ways. In one such approach, the automated item-selecting component 604 can use a deep-learning neural network to map the prior media selections to respective vectors in an abstract semantic space. The vectors may define a cluster within a particular region of the semantic space. The automated item-selecting component 604 can then choose a media item which maps to the same region of the abstract semantic space defined by the cluster of vectors. In a variant of this approach, the profile updating component 602 can generate the cluster of abstract semantic vectors as an offline process, and include those vectors as part of the group profile.

In another approach, the automated item-selecting component 604 can leverage a click log to find a similar media item (or items). The click log identifies each occasion in which a user selected two or more media items in a similar search context, e.g., in response to submitting the same input query, or within a same search session, etc. The automated item-selecting component 604 can treat the prior media selections of a group of users as anchor selections. It can then use the click log to find additional media selections that are linked to the anchor selections. The automated item-selecting component 604 can then choose one or more of the additional media items to present to the group. In a variant of this approach, the profile updating component 602 can identify the additional media selections as part of an offline process.

In still another approach, the automated item-selecting component 604 can randomly choose from among the media items that the group users have previously chosen on prior occasions. The automated item-selecting component 604 can then replay those media items. Still other implementations of the automated item-selecting component 604 are possible.

In one implementation, the search system 114 implements both the profile updating component 602 and the automated item-selecting component 604. In another implementation, the media BOT 112 implements at least the profiling updating component 602, and the search system 114 implements the automated item-selection component 604. In that latter case, the media BOT 112 passes profile information to the search system 114, which allows the search system 114 to perform its automated selection based on the profile information.

Each group of users can add one or more rules that determine when the automated item-selecting component 604 will automatically select media items. In one case, a group of users may provide a first rule that specifies that the automated item-selecting component 604 will automatically generate media items during a specified span of time (e.g., weekday afternoons). A second rule can specify that any media item explicitly selected by a user (via the conversational interface component 108) will override a media item selected by the automated item-selecting component 604; this means that the automated item-selecting component 604 will only select media items in the absence of explicit selections by the users. Furthermore, the system 102 will allow any user to disable the automated item-selecting component 604 at any time.

As a closing topic, the system 102 has been described above in the context of the control of the media playback equipment 106. But the system 102 can also be applied to controlling other equipment in a shared local setting, such as lighting equipment, home security equipment, etc.

Consider the application of the system 102 to the control of a home security system. As a preliminary operation, some individual or community of authorized individuals can prepare a curated corpus of searchable items pertaining to the security domain, if not already created. Each such document parallels the format of a media item in the curated media-specific corpus 116. For instance, instead of providing metadata which describes a song, a security-related document can provide metadata that describes a particular security situation. One such security situation can include the parameter values {garage door open, no occupants present in home}. And instead of providing an identifier that describes a particular song, the security document can provide an identifier associated with a particular action to be taken. For example, in the above security situation, the specified action might entail generating a security alarm. In essence, therefore, each such created document describes a rule that governs when a particular security-related action will be performed.

To ensure uniformity in the documents created by individuals, the community of authorized individuals can establish and promulgate rules that describe the preferred format of the documents. The community can also use an automated and/or semi-automated enforcement mechanism to monitor new documents that are supplied to the corpus to ensure that they conform to the preferred format. The enforcement mechanism operates by comparing each submitted document against a template that describes the preferred format. The enforcement mechanism can notify an individual who attempts to submit a non-conforming document, and invite the individual to resubmit the document in the correct format. In this implementation, the corpus constitutes a curated marketplace of rules.

In a real-time application phase, at least one user can enter a message into a message interface component. A security BOT can determine whether the message contains a triggering feature which indicates that the user has made a security control command, as when the user's message reads, "Tom's garage door is open and he is away on vacation. Assess security." Here, the term "assess security" might constitute a key term by which the security BOT concludes that the user is asking the system 102 to identify an appropriate security action to be performed, and then perform the security action. In other words, the user's message can be said to include a selection control command, similar to the "play" command in the above-described media-related context.

The security BOT may then forward the user's message to the search system 114. The search system 114 can then perform a domain-specific search over the corpus of security documents, to identify a document which most closely matches the input query. The security BOT will receive a query response identified by the search system 114. That query response will contain an ID that describes a preferred action to take, if any. The BOT will then generate security control information based on the query response. The security system can consume this security control information and take appropriate action, e.g., by automatically closing the garage door, or by sending an alarm to Tom to notify him of a potential threat.

In another scenario, the security BOT can determine that the user has made a non-selection command when the user enters a message with the intent of directly controlling the security system in a prescribed manner. For example, the security BOT can determine that the user has made a non-selection command when he inputs the message, "Lock the front door."

In another variation, the system 102 can use the above-described conversational interface component 108 in conjunction with the BOT 112 to control any type of local equipment (e.g., lighting equipment), but without interacting with the search system 114. In other words, the BOT 112 can process non-selection control commands, but not selection control commands that involve interaction with the search system 114. (Note that the BOT 112 is referred to as simply as a "BOT" in this implementation, rather than a "media BOT," because it need not serve a media-related purpose.)

More specifically, in the above variation, the conversational interface component 108 uses the same type of collaborative UI presentation 110 described above to receive a message from a particular user within the group of users 104. That message can include a control command to control the local equipment, as when the user writes, "Turn lights down to dim level." By writing this message, the particular user is also inherently communicating with the other users in the group, who also have simultaneous access to the collaborative UI presentation 110, and can see the particular user's message. In another case, the particular user can more directly interact with the other users while controlling the local equipment, as when the user writes, "I am turning the lights down to dim, unless anyone objects." In still other cases, the particular user may provide a user-to-user message that is solely directed to other users, and does not include any control command, as when the user writes, "Can anybody see what they are doing at this light level?" In one implementation, the BOT 112 can determine that the user has made a control command when the message includes one or more prescribed key terms.

The BOT 112 outputs control information to the command buffering component 120 when it detects that the user's message includes a control command. The BOT 112 performs this action without interacting with the search system 114. The BOT 112 takes no action on the user's message when the BOT 112 determines that it includes no control command.

B. Illustrative Processes

Figure 7:
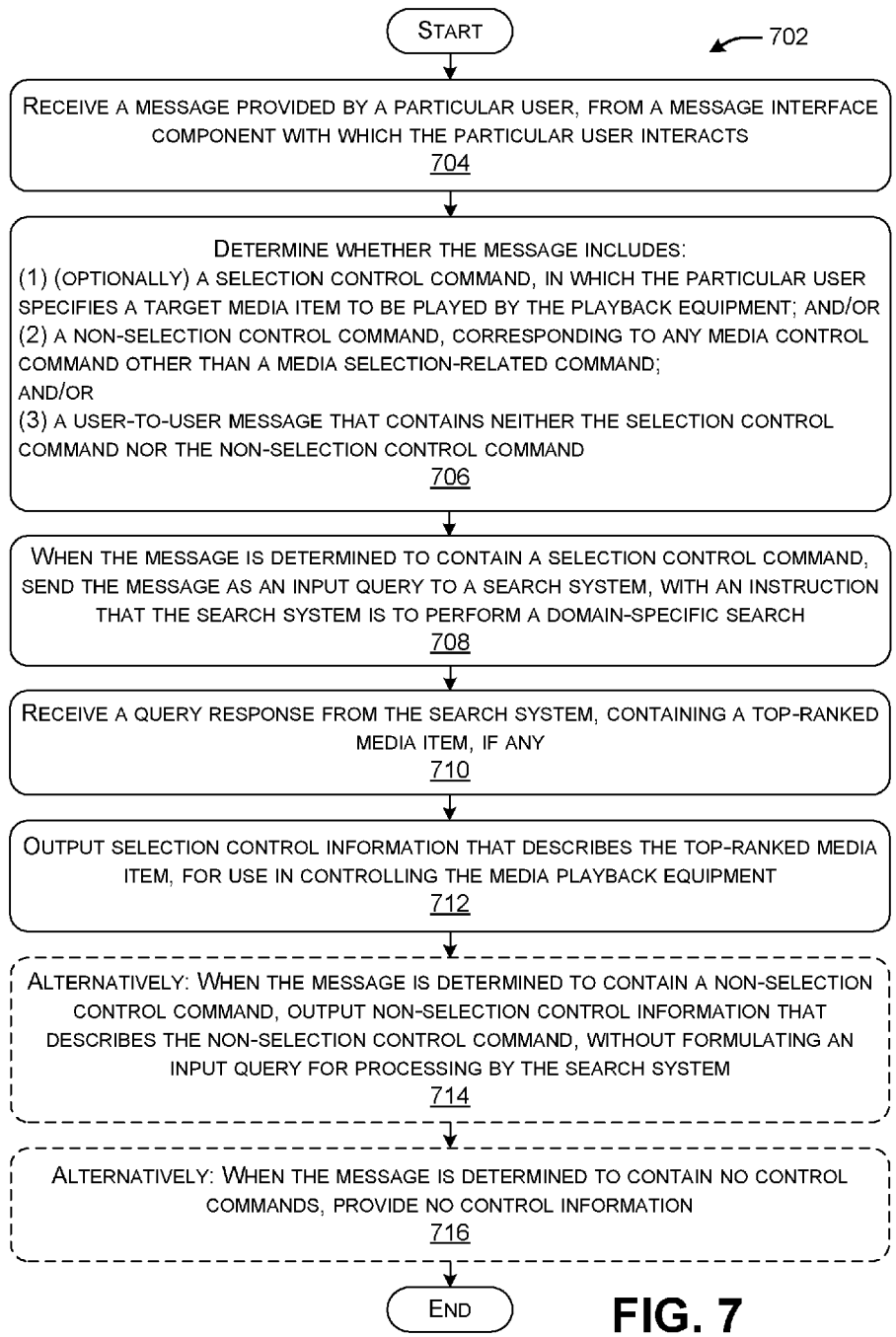
FIG. 7 shows a process that represents one manner of operation of the system of FIG. 1, from the perspective of the media BOT of FIG. 5.
Figure 8:
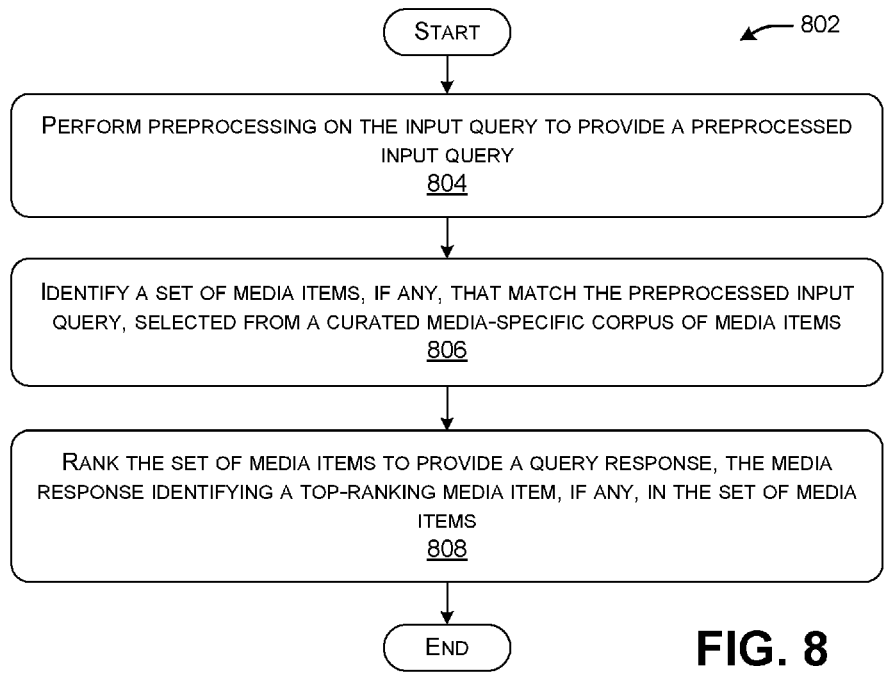
FIG. 8 shows a process that represents one manner operation of the search system of FIG. 1.
Figure 9:
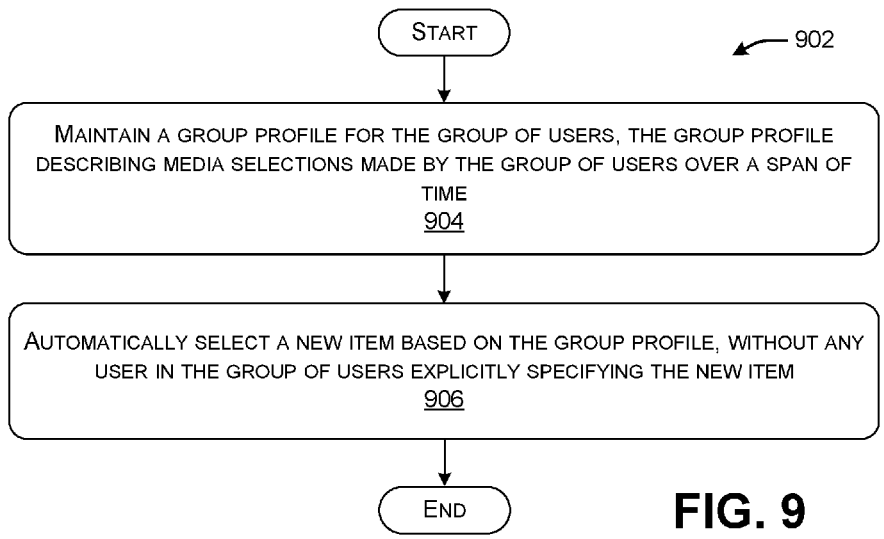
FIG. 9 shows a process that represents one manner of operation of the functionality of FIG. 6.

FIGS. 7-9 show processes that explain the operation of the system 102 of Section A in flowchart form. Since the principles underlying the operation of the system 102 have already been described in Section A, certain operations will be addressed in summary fashion in this section. As noted in the prefatory part of the Detailed Description, each flowchart is expressed as a series of operations performed in a particular order. But the order of these operations is merely representative, and can be varied in any manner.

FIG. 7 shows a process 702, implemented by one or more computing devices, for controlling any type of equipment, but the process 702 is described below in the context of controlling the media playback equipment 106. The process 702 is also described from the perspective of the media BOT 112. In block 704, the media BOT 112 receives a message provided by a particular user, from a message interface component with which the particular user interacts. For instance, the message interface component may correspond to the conversational interface component 108 shown in FIG. 1. In block 706, the media BOT 112 determines whether the message includes: a selection control command, in which the particular user specifies a target media item to be played by the playback equipment; and/or a non-selection control command, corresponding to any media control command other than a selection control command. First assume that the message includes a selection control comment.

In block 708, the media BOT 112 sends the message as an input query to a search system 114, together with information that instructs the search system 114 to perform a domain-specific search. In block 710, the media BOT 112 receives a query response from the search system 114, containing a top-ranked media item, if any. In block 712, the media BOT 112 outputs selection control information that describes the top-ranked media item to the command buffering component 120, for use in controlling the media playback equipment 106.

Alternatively, assume that the message provided by the particular user is determined to contain a non-selection control command. If so, in block 714, the media BOT 112 outputs non-selection control information to the command buffering component 120 that describes the non-selection control command, without formulating an input query for processing by the search system 114.

Alternatively, assume that the message provided by the particular user contains neither a selection control command nor a non-selection control command. If so, in block 716, the media BOT 112 provides no control information to the command buffering component 120.

In yet other cases, the process 702 is configured to process just the non-selection control commands (and user-to-user messages that do not include control commands), but not selection control commands. In that case, the process 702 omits interaction with the search system 114 associated with blocks 708 and 710.

FIG. 8 shows a process 802 performed by the search system 114, upon receiving an input query from the media BOT 112, together with an instruction to perform a domain-specific search. In block 804, the search system 114 performs preprocessing on the input query to provide a preprocessed input query. In block 806, the search system 114 identifies a set of media items, if any, that match the preprocessed input query, selected from a curated media-specific corpus 116 of media items. The curated media-specific corpus 116 is associated with a particular network-accessible domain. In block 808, the search system 114 ranks the set of media items to provide a query response. The media response identifies a top-ranked media item, if any, in the set of media items.

FIG. 9 shows a process 902 performed by the functionality shown in FIG. 6. In block 904, the profile updating component 602 maintains a group profile for the group of users, the group profile describing media selections made by the group of users over a span of time. In block 906, the automated item-selecting component 604 automatically selects a new item based on the group profile, without any user in the group of users explicitly specifying the new item.

C. Representative Computing Functionality

Figure 10:
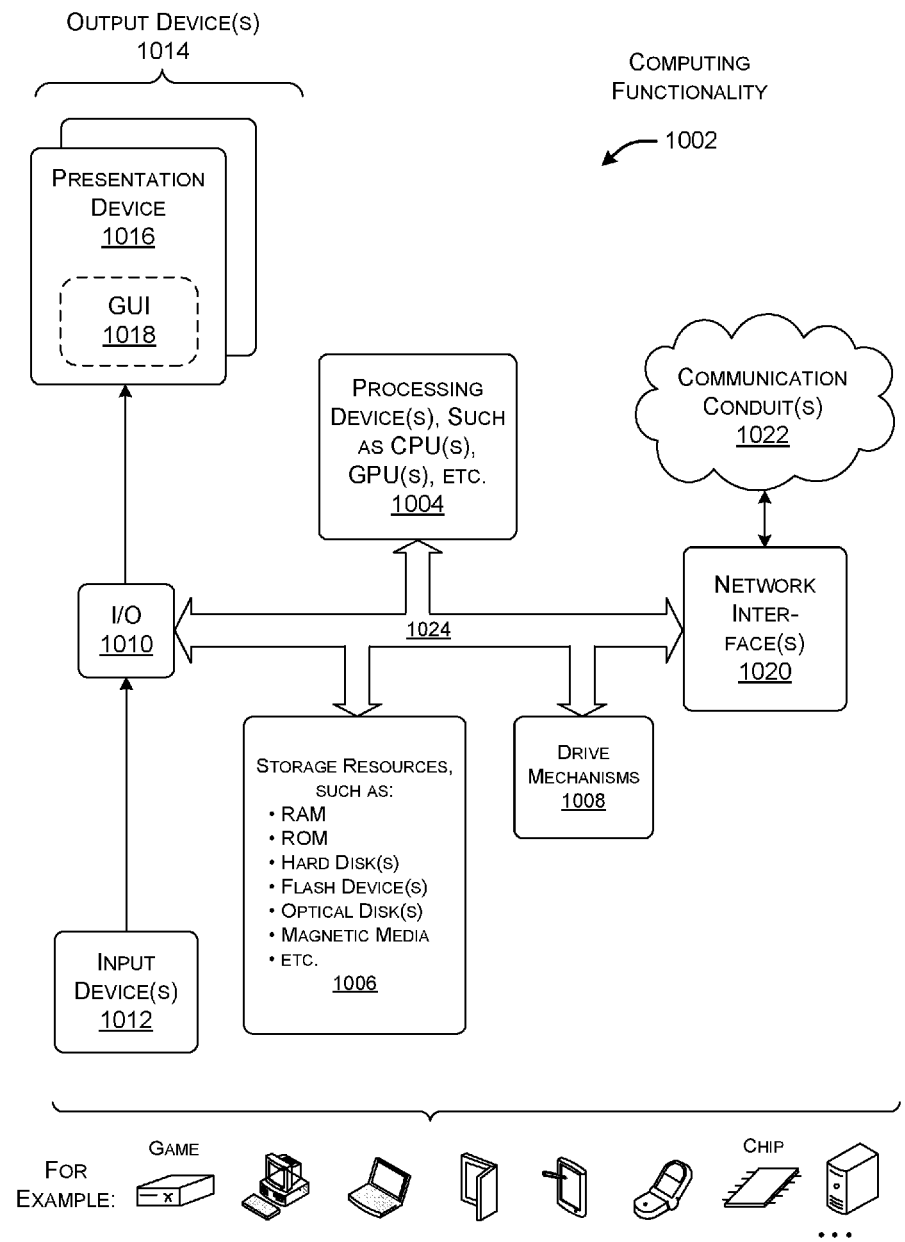
FIG. 10 shows illustrative computing functionality that can be used to implement any aspect of the features shown in the foregoing drawings.

FIG. 10 shows computing functionality 1002 that can be used to implement any aspect of the mechanisms set forth in the above-described figures. For instance, the type of computing functionality 1002 shown in FIG. 10 can be used to implement any local computing device shown in FIG. 2, and/or any remote server computing device provided by a remote computing system shown in FIG. 2, and/or any control mechanism provided by the local system 124 of FIG. 1. In all cases, the computing functionality 1002 represents one or more physical and tangible processing mechanisms.

The computing functionality 1002 can include one or more hardware processor devices 1004, such as one or more central processing units (CPUs), and/or one or more graphical processing units (GPUs), and so on. The computing functionality 1002 can also include any storage resources (also referred to as computer-readable storage media or computer-readable storage medium devices) 1006 for storing any kind of information, such as machine-readable instructions, settings, data, etc. Without limitation, for instance, the storage resources 1006 may include any of RAM of any type(s), ROM of any type(s), flash devices, hard disks, optical disks, and so on. More generally, any storage resource can use any technology for storing information. Further, any storage resource may provide volatile or non-volatile retention of information. Further, any storage resource may represent a fixed or removable component of the computing functionality 1002. The computing functionality 1002 may perform any of the functions described above when the hardware processor device(s) 1004 carry out computer-readable instructions stored in any storage resource or combination of storage resources. For instance, the computing functionality 1002 may carry out computer-readable instructions to perform each block of the processes described in Section B. The computing functionality 1002 also includes one or more drive mechanisms 1008 for interacting with any storage resource, such as a hard disk drive mechanism, an optical disk drive mechanism, and so on.

The computing functionality 1002 also includes an input/output component 1010 for receiving various inputs (via input devices 1012), and for providing various outputs (via output devices 1014). Illustrative input devices include a keyboard device, a mouse input device, a touchscreen input device, a digitizing pad, one or more video cameras, one or more depth cameras, a free space gesture recognition mechanism, one or more microphones, a voice recognition mechanism, any movement detection mechanisms (e.g., accelerometers, gyroscopes, etc.), and so on. One particular output mechanism may include a display device 1016 and an associated graphical user interface presentation (GUI) 1018. The conversational interface component 108 can present the collaborative UI presentation 110 shown in FIG. 3 on the display device 1016. The display device 1016 may correspond to a charge-coupled display device, a cathode ray tube device, a projection mechanism, etc. The computing functionality 1002 can also include one or more network interfaces 1020 for exchanging data with other devices via one or more communication conduits 1022. One or more communication buses 1024 communicatively couple the above-described components together.

The communication conduit(s) 1022 can be implemented in any manner, e.g., by a local area computer network, a wide area computer network (e.g., the Internet), point-to-point connections, etc., or any combination thereof. The communication conduit(s) 1022 can include any combination of hardwired links, wireless links, routers, gateway functionality, name servers, etc., governed by any protocol or combination of protocols.

Alternatively, or in addition, any of the functions described in the preceding sections can be performed, at least in part, by one or more hardware logic components. For example, without limitation, the computing functionality 1002 (and its hardware processor) can be implemented using one or more of: Field-programmable Gate Arrays (FPGAs); Application-specific Integrated Circuits (ASICs); Application-specific Standard Products (ASSPs); System-on-a-chip systems (SOCs); Complex Programmable Logic Devices (CPLDs), etc. In this case, the machine-executable instructions are embodied in the hardware logic itself.

The following summary provides a non-exhaustive list of illustrative aspects of the technology set forth herein.

According to a first aspect, a system environment, including one or more computing devices, is described for controlling media playback equipment. The system environment includes a message interface component configured to receive a message from a particular user via a user interface presentation provided by the message interface component. The system environment also includes a media BOT configured to: receive the message; determine whether the message includes a selection control command, in which the particular user specifies a target media item to be played by the media playback equipment; and when the message is determined to contain the selection control command, send the message as an input query to a search system, with instruction that the search system is to perform a domain-specific search. The search system subsequently processes the input query by: performing preprocessing on the input query to provide a preprocessed input query; identifying a set of media items, if any, that match the preprocessed input query, selected from a curated media-specific corpus of media items; and ranking the set of media items to provide a query response, the query response identifying a top-ranked media item, if any, in the set of media items. The media BOT is also configured to receive the query response from the search system, containing the top-ranked media item, if any; and output selection control information that describes the top-ranked media item. The system environment also includes a command buffering component configured to store the selection control information in a data store. The system environment also includes a local system configured to: receive the selection control information from the command buffering command component; and control the media playback equipment based on the selection control information, by playing the top-ranked media item on the media playback equipment.

According to a second aspect, the message interface component is a conversational interface component that is configured to provide one or more instances of a collaborative user interface presentation for use by respective users in a group of users, including the particular user. Each instance of the collaborative user interface presentation reveals messages entered by the users in the group.

According to a third aspect, a set of messages entered by the users of the group includes: a first subset of user-to-BOT messages that includes commands directed to the media BOT, and a second subset of user-to-user messages that do not include commands directed to the media BOT. The media BOT is configured to discriminate between the first subset of messages and the second subset of messages.

According to a fourth aspect, the media BOT is configured to detect whether a particular message is a user-to-BOT message by determining whether the particular message includes a triggering feature associated with a command.

According to a fifth aspect, the triggering feature corresponds to at least one triggering keyword.

According to a sixth aspect, the system environment further includes a profile updating component configured to maintain a group profile for the group of users, the group profile describing media selections made by the group of users over a span of time. Each entry in the group profile includes: an identity of a prior media item that has been selected; and context information pertaining to a circumstance in which the prior media item has been selected.

According to a seventh aspect, the system environment further includes an automated item-selecting component configured to automatically select a new media item based on the group profile, without any user in the group of users explicitly specifying the new media item in a message.

According to an eighth aspect, the media BOT is also configured to: determine whether the message includes a non-selection control command, corresponding to any media control command other than the selection control command; and when the message is determined to contain the non-selection control command, send non-selection control information that describes the non-selection control command to the command buffering component, without formulating an input query for processing by the search system. The local system is also configured to: receive the non-selection control information from the command buffering command component; and control the media playback equipment based on the non-selection control information.

According to a ninth aspect, the curated media-specific corpus is associated with a particular network-accessible domain. Further, the search system is implemented using processing resources provided by a general-purpose search system, the general-purpose search system being originally configured to perform a domain-agnostic search, in which the general-purpose search system identifies result items that match a user query without respect to respective domains associated with those result items.

According to a tenth aspect, the local system is configured to receive the selection control information by polling the command buffering component to determine whether it includes any instances of command information not yet received by the local system.

According to an eleventh aspect, the selection control information includes an identifier that identifies the top-ranked media item. Further, the local system is configured to play the top-ranked media item by retrieving the top-ranked media item from the curated media-specific corpus.

According to a twelfth aspect, one or more computing devices are described that implement a BOT for use in controlling equipment in a local setting. The computing device(s) include a message-receiving component configured to receive a message provided by a particular user, from a message interface component with which the particular user interacts. The computing device(s) also include a command extraction component configured to: determine whether the message provided by the particular user includes a selection control command, in which the particular user specifies a target item; and when the message is determined to contain the selection control command, send the message as an input query to a search system, with instruction that the search system is to perform a domain-specific search. The search system generates a query response in response to the input query by searching a curated domain-specific corpus of items, the query response identifying a top-ranked item, if any. The computing device(s) also includes a result processing component configured to: receive the query response from the search system, containing the top-ranked item, if any; and provide selection control information that describes the top-ranked item to a local control system for use in controlling the equipment.

According to a thirteenth aspect, the message interface component (associated with the twelfth aspect) is a conversational interface component that is configured to provide one or more instances of a collaborative user interface presentation for use by respective users in a group of users, including the particular user. Each instance of the collaborative user interface presentation reveals messages entered by the users in the group.

According to a fourteenth aspect, the command extraction component is also configured to: determine whether the message includes a non-selection control command, corresponding to any control command other than the selection control command; and when the message is determined to contain the non-selection control command, send non-selection control information that describes the non-selection control command to the local system, without formulating an input query for processing by the search system.

According to a fifteenth aspect, the curated domain-specific corpus (associated with the twelfth aspect) is associated with a particular network-accessible domain. Further, the search system is implemented using processing resources provided by a general-purpose search system, the general-purpose search system being originally configured to perform a domain-agnostic search, in which the general-purpose search system identifies result items that match a user query without respect to respective domains associated with those result items.

According to a sixteenth aspect, a method is described, implemented by one or more computing devices, for controlling equipment in a local setting. The method includes receiving a message provided by a particular user, from a message interface component with which the particular user interacts. The message interface component corresponds to a conversational interface component that is configured to provide one or more instances of a collaborative user interface presentation for use by respective users in a group of users, including the particular user. Each instance of the collaborative user interface presentation reveals messages entered by the users in the group. The method further includes determining whether the message provided by the particular user: includes a control command directed to the equipment in the local setting; or is a user-to-user message that does not contain a control command. The method further includes, when the message is determined to contain a control command, outputting control information that describes the control command for use in controlling the equipment in the local setting.

According to a seventeenth aspect, the equipment in the local setting is media playback equipment for playing media items. Further, the above-referenced determining of whether the message includes a control command includes determining whether the message contains: a selection control command, in which the particular user specifies a target media item to be played by the media playback equipment; and/or a non-selection control command, corresponding to any media control command other than a selection control command. The method further includes when the message is determined to contain the selection control command, sending the message as an input query to a search system, with instruction that the search system is to perform a domain-specific search. The search system subsequently processes the input query by: performing preprocessing on the input query to provide a preprocessed input query; identifying a set of media items, if any, that match the preprocessed input query, selected from a curated media-specific corpus of media items; and ranking the set of media items to provide a query response, the media response identifying a top-ranked media item, if any, in the set of media items. The method further includes receiving the query response from the search system, containing the top-ranked media item, if any. The above-referenced outputting corresponds to outputting selection control information that describes the top-ranked media item, for use in controlling the media playback equipment.

According to an eighteenth aspect, the method further includes: maintaining a group profile for the group of users, the group profile describing media selections made by the group of users over a span of time; and automatically selecting a new media item based on the group profile, without any user in the group of users explicitly specifying the new media item.

According to a nineteenth aspect, when the message is determined to contain the non-selection control command, the above-referenced outputting corresponds to outputting non-selection control information that describes the non-selection control command, without formulating an input query for processing by the search system.

According to a twentieth aspect, the curated media-specific corpus (associated with the sixteenth aspect) is associated with a particular network-accessible domain. The search system is implemented using processing resources provided by a general-purpose search system, the general-purpose search system being configured to perform a domain-agnostic search, in which the general-purpose search system identifies result items that match a user query without respect to respective domains associated with those result items.

A twenty-first aspect corresponds to any combination (e.g., any permutation or subset that is not logically inconsistent) of the above-referenced first through twentieth aspects.

A twenty-second aspect corresponds to any method counterpart, device counterpart, system counterpart, means-plus-function counterpart, computer-readable storage medium counterpart, data structure counterpart, article of manufacture counterpart, graphical user interface presentation counterpart, etc. associated with the first through twenty-first aspects.

In closing, the functionality described herein can employ various mechanisms to ensure that any user data is handled in a manner that conforms to applicable laws, social norms, and the expectations and preferences of individual users. For example, the functionality can allow a user to expressly opt in to (and then expressly opt out of) the provisions of the functionality. The functionality can also provide suitable security mechanisms to ensure the privacy of the user data (such as data-sanitizing mechanisms, encryption mechanisms, password-protection mechanisms, etc.).

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:
1. A system, comprising:
one or more hardware processor devices; and
storage storing computer-executable instructions which, when executed by the one or more hardware processor devices, cause the one or more hardware processor devices to:
receive a message from a particular user;
determine whether the message includes a selection control command specifying a target media item to be played by media playback equipment, or a non-selection control command;
in a first instance where the message is determined to contain the selection control command:
send the message as an input query to a search system,
receive a query response to the input query from the search system, the query response identifying a top-ranked media item, and
control the media playback equipment to play the top-ranked media item on the media playback equipment; and
in a second instance where the message is determined to contain the non-selection control command, control the media playback equipment based at least on the non-selection control without interacting with the search system.

2. The system of claim 1, wherein the computer-executable instructions further cause the one or more hardware processor devices to:
provide one or more instances of a collaborative user interface presentation for use by users in a group of users, including the particular user, each instance of the collaborative user interface presentation revealing messages entered by the users in the group.

3. The system of claim 2, wherein the computer-executable instructions further cause the one or more hardware processor devices to:
implement a media BOT that is configured to discriminate between a first subset of the messages entered by the users that includes commands directed to the media BOT and a second subset of the messages entered by the users that does not include commands directed to the media BOT.

4. The system of claim 3, wherein the computer-executable instructions further cause the one or more hardware processor devices to:

detect whether a particular message is a user-to-BOT message by determining whether the particular message includes a triggering feature associated with a command.

5. The system of claim 4, wherein the triggering feature corresponds to at least one triggering keyword.

6. The system of claim 2, wherein the computer-executable instructions further cause the one or more hardware processor devices to:
maintain a group profile for the group of users, the group profile describing media selections made by the group of users over a span of time, each entry in the group profile including:
an identity of a prior media item that has been selected; and
context information pertaining to a circumstance in which the prior media item has been selected.

7. The system of claim 6, wherein the computer-executable instructions further cause the one or more hardware processor devices to:
automatically select a new media item based at least on the group profile, without any user in the group of users explicitly specifying the new media item in a new message.

8. The system of claim 1, wherein the computer-executable instructions further cause the one or more hardware processor devices to:
in the second instance, send non-selection control information that describes the non-selection control command to a command buffering component; and
send the non-selection control information from the command buffering component to the media playback equipment.

9. The system of claim 1, wherein the top-ranked media item is retrieved from a curated media-specific corpus that is associated with a particular network-accessible domain.

10. The system of claim 9, wherein the search system is implemented using processing resources provided by a general-purpose search system, the general-purpose search system being originally configured to perform a domain-agnostic search, in which the general-purpose search system identifies result items that match a user query without respect to respective domains associated with those result items.

11. The system of claim 9, wherein the computer-executable instructions further cause the one or more hardware processor devices to:
retrieve the top-ranked media item from the curated media-specific corpus.

12. One or more computing devices, comprising:
a processor; and
storage storing computer-executable instructions which, when executed by the processor, cause the processor to:
receive a message provided by a particular user;
determine whether the message provided by the particular user includes a selection control command specifying a target media item to be played by media playback equipment, or a non-selection control command;
where the message is determined to contain the selection control command:
send the message as an input query to a search system, with instruction that the search system is to perform a domain-specific search,
receive a query response to the input query from the search system, the query response identifying a top-ranked media item that corresponds to the target media item, and
control the media playback equipment to play the top-ranked media item; and
where the message is determined to contain the non-selection control command, control the media playback equipment based at least on the non-selection control without interacting with the search system.

13. The one or more computing devices of claim 12, wherein the computer-executable instructions further cause the processor to:
provide one or more instances of a collaborative user interface presentation for use by respective users in a group of users, including the particular user.

14. The one or more computing devices of claim 12, wherein the computer-executable instructions further cause the processor to:
retrieve the top-ranked media item from a curated domain-specific corpus.

15. The one or more computing devices of claim 14, wherein the curated domain-specific corpus is associated with a particular network-accessible domain, and wherein the search system is implemented using processing resources provided by a general-purpose search system, the general-purpose search system being originally configured to perform a domain-agnostic search, in which the general-purpose search system identifies result items that match a user query without respect to respective domains associated with those result items.

16. A method, implemented by one or more computing devices, the method comprising:
receiving a message provided by a particular user;
determining whether the message provided by the particular user contains an equipment control command directed to equipment in a local setting or contains a selection control command;
where the message is determined to contain the selection control command, sending the message as an input query to a search system, with instruction that the search system is to perform a domain-specific search for a target media item to be played on the equipment; and
where the message is determined to contain the equipment control command, outputting control information that describes the equipment control command for use in controlling the equipment in the local setting.

17. The method of claim 16, wherein the selection control command comprises a specification of the target media item to be played by the equipment in the local setting.

18. The method of claim 16, further comprising:
maintaining a group profile for a group of users including the particular user, the group profile describing media selections made by the group of users; and
automatically selecting a new media item based at least on the group profile, without any user in the group of users explicitly specifying the new media item.

19. The method of claim 16, wherein the equipment in the local setting comprises media playback equipment.

20. The method of claim 16, further comprising:
identifying the target media item specified by the selection control command, wherein the domain-specific search accesses a curated media-specific corpus that includes the target media item;
receiving the target media item from the curated media-specific corpus; and
causing the equipment in the local setting to play the target media item.

* * * * *